United States Patent [19]

Durbin

[11] Patent Number: 4,611,310

[45] Date of Patent: Sep. 9, 1986

[54] METHOD AND SYSTEM FOR REARRANGING DATA RECORDS IN ACCORDANCE WITH KEYFIELD VALUES

[75] Inventor: James W. Durbin, Redway, Calif.

[73] Assignee: Canevari Timber Co., Fortuna, Calif.

[21] Appl. No.: 410,414

[22] Filed: Aug. 23, 1982

[51] Int. Cl.⁴ .............................................. G11C 8/00
[52] U.S. Cl. ................................................... 365/230
[58] Field of Search ... 364/200 MS File, 900 MS File; 365/230, 233

[56] References Cited

U.S. PATENT DOCUMENTS

| | | | |
|---|---|---|---|
| 3,514,760 | 9/1967 | Kautz | 340/172.5 |
| 3,533,074 | 10/1970 | Webb | 340/172.5 |
| 3,714,634 | 1/1973 | Dirks et al. | 340/172.5 |
| 3,815,083 | 6/1974 | Dirks et al. | 340/172.5 |
| 3,931,612 | 1/1976 | Stevens et al. | 340/172.5 |
| 3,973,245 | 8/1976 | Belser | 364/200 |
| 3,976,980 | 8/1976 | Hertz | 364/200 |
| 4,003,031 | 1/1977 | Kashio | 340/172.5 |
| 4,024,508 | 5/1977 | Bachman et al. | 364/200 |
| 4,030,077 | 6/1977 | Florence et al. | 340/172.5 |
| 4,031,520 | 6/1977 | Rohner | 364/200 |
| 4,052,699 | 10/1977 | Micka et al. | 364/900 |
| 4,131,947 | 12/1978 | Armstrong | 364/900 |
| 4,145,753 | 3/1979 | Kashio | 364/900 |
| 4,209,845 | 6/1980 | Berger et al. | 364/900 |
| 4,249,247 | 2/1981 | Patel | 364/900 |
| 4,281,393 | 7/1981 | Gitelman et al. | 364/900 |
| 4,312,045 | 1/1982 | Tean et al. | 364/900 |

Primary Examiner—Gareth D. Shaw
Assistant Examiner—John G. Mills
Attorney, Agent, or Firm—Spensley Horn Jubas & Lubitz

[57] ABSTRACT

A system and method for manipulating a plurality of data records. Each record is comprised of a plurality of bits and is identified by a unique record address value. A portion of each record comprises a keyfield and each keyfield is generally divided into a plurality of sub-keyfields, each having a different order of significance. The sub-keyfield value of greatest significance of each record is utilized to set one memory location in the column of a matrix memory means corresponding to the record address value of that record, said memory location being in the row of the matrix memory means corresponding to the sub-keyfield value of that record. The column position values of the set memory locations are then arranged in order of row position, and the column position values derived from the same row are grouped together. The process is successively repeated, separately for each group of column position values, for the sub-keyfield value of next greatest significance of each record having a record address value corresponding to a column position value in said group as long as at least one group of column position values remain.

25 Claims, 6 Drawing Figures

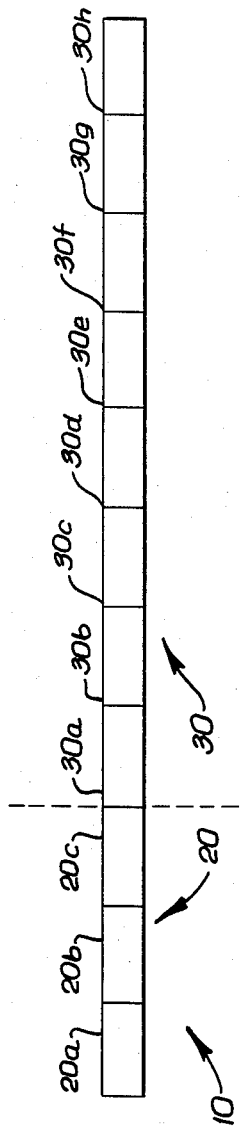

Fig. 5

| | | ACTIVE FLAG REGISTER | DUPLICATE FLAG RAM | SORT RAM (ROW; COLUMN) |
|---|---|---|---|---|
| A | BITS SET | 2, 18, 19, 119, 129, 191 | 2, 18 | (2;4) (2;6) (18;1) (18;3) (19;7) (119;2) (129;0)(191;5) |
| | BITS RESET | ALL OTHERS | 19, 119, 129, 191 | ALL OTHERS IN ROWS 2; 18; 19; 119; 129; 191 |
| | DON'T CARES | NONE | ALL OTHERS | ALL ROWS OTHER THAN 2; 18; 19; 119; 129; 191 |
| B | BITS SET | 116; 118 | NONE | (116;3) (118;1) |
| | BITS RESET | ALL OTHERS | 116 & 118 | ALL OTHERS IN ROWS 116 & 118 |
| | DON'T CARES | NONE | ALL OTHERS | ALL ROWS OTHER THAN 116 & 118 |
| C | BITS SET | 47 | 47 | (47, 4) (47, 6) |
| | BITS RESET | ALL OTHERS | NONE | ALL OTHERS IN ROW 47 |
| | DON'T CARES | NONE | ALL OTHERS | ALL ROWS OTHER THAN 47 |
| D | BITS SET | 184; 188 | NONE | (184;6) (188;4) |
| | BITS RESET | ALL OTHERS | 184; 188 | ALL OTHERS IN ROWS 184; 188 |
| | DON'T CARES | NONE | ALL OTHERS | ALL ROWS OTHER THAN 184 & 188 |

| | SORT RAM BITS | | | | | | | | | OUTPUT RAM ADDRESS (BINARY) | | | | | | | | |
|---|---|---|---|---|---|---|---|---|---|---|---|---|---|---|---|---|---|---|
| | 0 | 1 | 2 | 3 | 4 | 5 | 6 | 7 | – – – – – | $2_{55}$ | $2_{56}$ | $2_{57}$ | $2_{58}$ | $2_{59}$ | $2_{60}$ | $2_{61}$ | $2_{62}$ | $2_{63}$ |
| 0 | 0 | 0 | 0 | 0 | 1 | 0 | 1 | 0 | | 0 | 0 | 0 | 0 | 0 | 0 | 0 | 0 | 0 |
| 1 | 0 | 1 | 0 | 1 | 0 | 0 | 0 | 0 | | 0 | 0 | 0 | 0 | 0 | 0 | 0 | 1 | 0 |
| 2 | | | | | | | | | | | | | | | | | | |
| | ← DON'T CARES → | | | | | | | | | ← DON'T CARES → | | | | | | | | |
| 127 | | | | | | | | | | | | | | | | | | |

B

| | | SORT RAM BITS | | | | | | | | | OUTPUT RAM ADDRESS (BINARY) | | | | | | | | |
|---|---|---|---|---|---|---|---|---|---|---|---|---|---|---|---|---|---|---|
| | | 0 | 1 | 2 | 3 | 4 | 5 | 6 | 7 | – – – – | $2_{55}$ | $2_{56}$ | $2_{57}$ | $2_{58}$ | $2_{59}$ | $2_{60}$ | $2_{61}$ | $2_{62}$ | $2_{63}$ |
| FIRST COUNTER | 0 | | | | | | | | | | | | | | | | | | |
| | 1 | | | | | | | | | | | | | | | | | | |
| | 2 | ← DON'T CARES → | | | | | | | | | ← DON'T CARES → | | | | | | | | |
| SECOND COUNTER | 126 | | | | | | | | | | | | | | | | | | |
| | 127 | 0 | 0 | 0 | 0 | 1 | 0 | 1 | 0 | | 0 | 0 | 0 | 0 | 0 | 0 | 0 | 0 | 0 |

METHOD AND SYSTEM FOR REARRANGING DATA RECORDS IN ACCORDANCE WITH KEYFIELD VALUES

BACKGROUND OF THE INVENTION

1. Field of the Invention

This invention relates to systems and methods for rearranging data records in accordance with the value of a keyfield associated with each record.

Information to be processed by a computer apparatus may be stored in computer memory or on some external storage device such as a magnetic tape or magnetic disk. The information is typically blocked or grouped into units, commonly referred to as "records" each of which contains similar information. For example, a business may compile a record on each of its employees, customers and/or products. Each record is comprised of different pieces of information, commonly referred to as "fields." For example, an employee record may include fields such as his name, age, address and social security number. Each field contains one or more alphanumeric characters. Each alphanumeric character is typically coded in binary form.

It is frequently desirable to arrange or rearrange records into an ordered sequence under the control of a selected field, commonly referred to as the "keyfield." For example, it may be desirable to arrange employee records in alphabetical order by employee name. This is typically accomplished by viewing the code for the alphanumeric characters comprising the keyfield as a binary number and then forming an ordered sequence under the control of that binary number.

2. Description of the Prior Art

Rearranging records is one of the most extensive computations performed by today's general purpose computers. To accomplish this task, systems for rearranging records in accordance with the coded binary value of a keyfield associated with each record are well known. However, such systems have several disadvantages associated with them. For example, some systems operate at relatively slow speeds due to the fact that for each record, each and every bit comprising the keyfield of that record is processed in series. Other systems also function at relatively slow speeds due to the fact that the keyfield of a record is directly compared with the keyfields of many or all other records. Some systems overcome this speed limitation, but require multiple, duplicative stages of comparison hardware and/or relatively large amounts of local storage Accordingly, it is an object of the present invention to provide a general system and method for rearranging a plurality of records in accordance with the coded binary value of a keyfield associated with each record which overcomes the above disadvantages.

SUMMARY OF THE INVENTION

This invention is directed to a method and system for rearranging a plurality of records, each having a keyfield, in accordance with the coded binary value of the keyfields. Each keyfield comprises a plurality of keyfield bits arranged in a predetermined keyfield bit order. Each keyfield is divided into sub-keyfields which are adjacent portions of keyfields comprising an equal number of keyfield bits. Processing is performed on successive sub-keyfields in order of decreasing sub-keyfield significance until the desired order is determined.

Each record is accessible by a unique corresponding record address. The present invention includes a random access memory for storing data in a matrix fashion. The addressable rows of the matrix correspond to sub-keyfield values, and the columns correspond to record addresses. This matrix organized memory is hereinafter referred to as the Sort RAM.

The first step in the rearranging method and system disclosed by the present invention is to load the Sort RAM. The most significant sub-keyfield of each record is accessed and processed in order of its corresponding record address. Using the sub-keyfield value to select a row of the Sort RAM and the unique record address to select a column of the Sort RAM, a selected bit is set. At the completion of the loading process, one bit will be set in each column of the Sort RAM. For each column, the set bit will be in the row of the Sort RAM which corresponds to the sub-keyfield value of the associated record.

The second step in the rearranging method and system is to write to a storage means the record addresses arranged in accordance with the most significant sub-keyfield value of their corresponding records. Since rows of the Sort RAM correspond to sub-keyfield values and columns correspond to record addresses, record address ordering may be accomplished by writing in consecutive order to the storage means the column number of bits set in the Sort RAM in ascending order of their corresponding row addresses.

Upon completion of the above-discussed two-step process the record addresses in the storage means may be used to read the records in corresponding order, thereby furnishing the records in ascending order of most significant sub-keyfield values.

The rearranged address order after this two-step process is the desired order, provided that no two records have the same most significant sub-keyfield values; i.e., at the completion of the loading step no more than one bit in any row of the Sort RAM was set. If this is not the case, however, then record addresses corresponding to bits set in the same row of the Sort RAM would not necessarily be properly ordered relative to each other, although as a group would be properly ordered relative to all other record addresses.

In order to arrange records having identical most significant sub-keyfield values, the above-discussed two-step process is repeated successively for each group of such records using the next most significant sub-keyfield. The rearranged record addresses of a particular group are then rewritten to the same place in the storage means in order to preserve the proper record address order with respect to all other record addresses.

The algorithm is repeated with respect to successive sub-keyfields in order of decreasing significance until each record is found to have a unique keyfield value, or all sub-keyfields have been processed.

BRIEF DESCRIPTION OF THE DRAWINGS

FIG. 1 depicts the data format of a record for illustrating the method and system of the present invention.

FIGS. 2A through E depicts a series of tables showing the sub-keyfield values of eight records and their corresponding record addresses; each successive table illustrating a subsequent processing stage in a preferred embodiment of the present invention.

FIGS. 5A through D depicts a series of tables showing which bits are set in memory means of the present invention; each successive table illustrating a subsequent stage in a preferred embodiment of the present invention.

FIGS. 6A and B depict two tables showing the stack entries at different processing stages in a preferred embodiment of the present invention.

DETAILED DESCRIPTION OF THE PREFERRED EMBODIMENT

Figure 3:
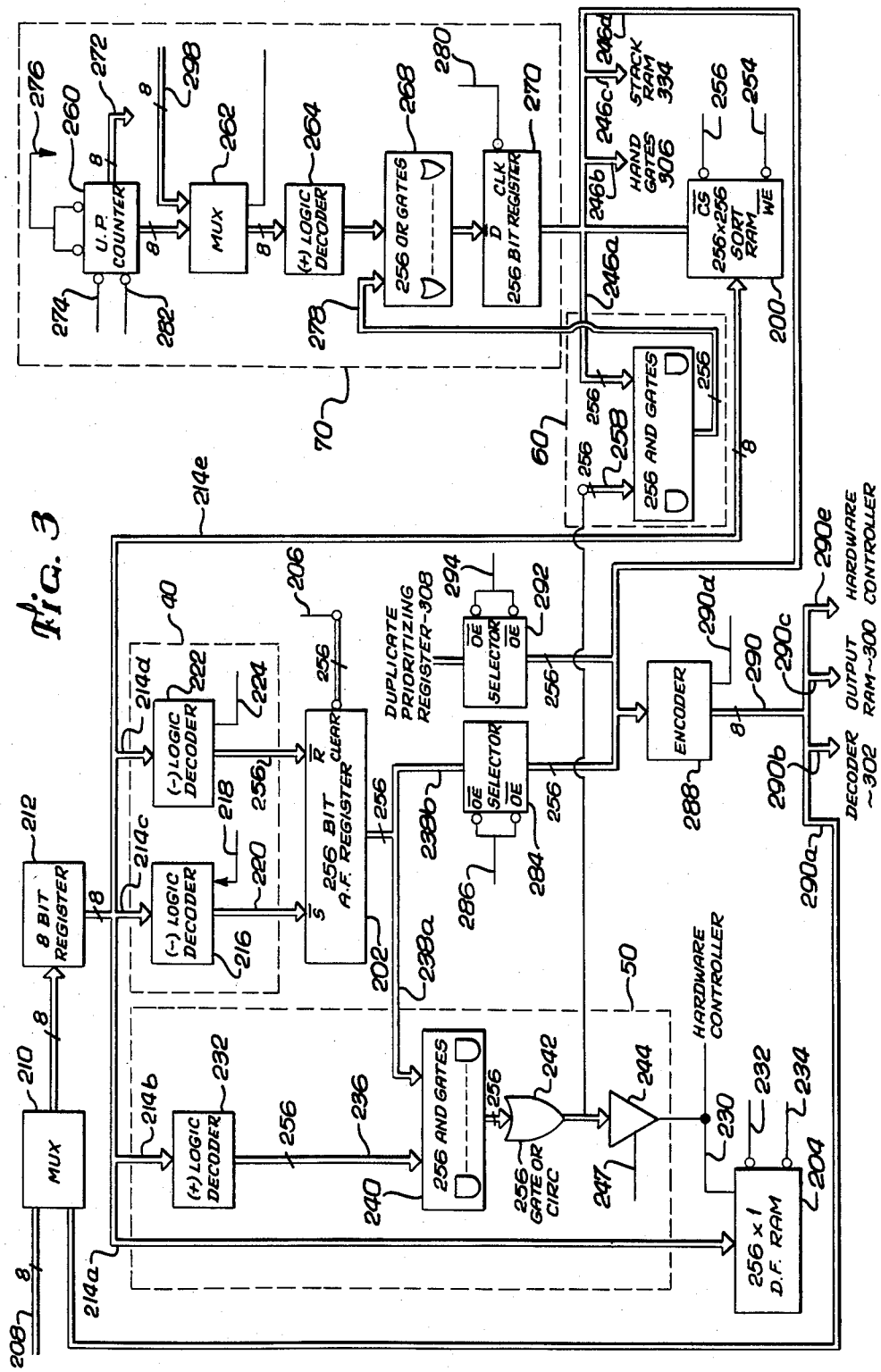
FIG. 3 is a block diagram of the memory loading circuitry in a preferred embodiment of the present invention.

The following description is of the best presently contemplated mode of carrying out the invention. This description is not to be taken in a limiting sense, but is made merely for the purpose of illustrating the general principles of the invention. The scope of the invention is best defined by the appended claims.

In a preferred embodiment of the present invention, the circuitry comprising the invention is controlled by a microprogrammed hardware controller interfaced to a general purpose computer. The records to be rearranged are loaded into the computer's memory and each is assigned a unique record address. For purposes of illustration, it will be assumed that up to two hundred fifty-six records may be simultaneously arranged and that the record addresses range from 0 to 255.

Records having a data format as shown in FIG. 1 are to be rearranged in accordance with their keyfield values. Each record 10 includes a 24-bit keyfield 20 which in turn is comprised of three 8-bit sub-keyfields 20a, 20b and 20c arranged in order of descending significance. The binary coded value of each sub-keyfield is therefore from 0 to 255. The record 10 further includes eight additional 8-bit fields 30a through 30h. The rearranging method and system of the present invention is capable of rearranging records of virtually any data format, for example: any number of sub-keyfields; any number of additional fields; sub-keyfields interspersed throughout the record; nested or overlapped sub-keyfields; and variable size sub-keyfields.

FIG. 2A shows in decimal notation the values of the three sub-keyfields of eight different records having addresses 0 through 7. The operation of the present invention will now be illustrated with reference to these eight records as sample records to be rearranged into ascending keyfield value order.

FIG. 3 is a block diagram of the Memory Loading logic of the present invention. The three primary components included in this logic are the Sort RAM 200, Active Flag Register 202, and Duplicate Flag RAM 204.

The Sort RAM 200 is a random access memory comprising a 256 by 256 matrix of discrete bit locations. Rows of the Sort RAM correspond to sub-keyfield values 0 through 255, and columns correspond to the record addresses 0 through 255. At the completion of Memory Loading, bit (r, c) will be set if and only if the record corresponding to a column c of the memory 200 has a sub-keyfield value r.

Active Flag Register 202 is a register comprised of two hundred fifty-six individual $\overline{RS}$-type flip-flops corresponding to sub-keyfield values 0 through 255. At the completion of Memory Loading, bit r of the register 202 will be set if and only if at least one record has a sub-keyfield value r. Active Flag Register 202 is utilized to indicate which rows of the Sort RAM 200 have at least one bit set.

The Duplicate Flag RAM 204 is a random access memory comprising a 256 by 1 matrix of discrete bit locations. At the completion of Memory Loading, bit r of the RAM 204 will be set if and only if more than one record contains a sub-keyfield having a value of r. Duplicate Flag RAM 204 is utilized to indicate which rows of Sort RAM 200 have more than one bit set. That is, the Duplicate Flag RAM 204 provides an indication that two or more records have the same sub-keyfield value.

By way of an overview of the operation of the Memory Loading logic, the hardware controller (not shown) successively provides along 8-bit data line 208 the most significant sub-keyfield of each record in increasing record address order. The sub-keyfield value passed through multiplexer 210 is latched into an 8-bit register 212. This latched value is then utilized to set and reset appropriate bits in the Active Flag Register 202, Duplicate Flag RAM 204 and Sort RAM 200 by the following sequence of operations. First, the contents of the Active Flag Register 202 are sampled to determine whether the bit corresponding to the latched value is set. If it is not set, then the bit in the Duplicate Flag RAM 204 corresponding to the latched value is reset. If it is set, however, the corresponding bit in the Duplicate Flag RAM 204 is set. Second, the bit in the Active Flag Register 202 corresponding to the latched value is set. Third, the bit corresponding to the address of the record currently being processed is set in the Sort RAM 200 row corresponding to the latched value currently being processed.

The control of Sort RAM 200, Active Flag Register 202 and Duplicate Flag RAM 204 is accomplished by means of control circuits 40, 50, 60 and 70. The bit in Active Flag Register 202 corresponding to the latched sub-keyfield value is set using control circuitry 40. Using control circuitry 50, the bit in Duplicate Flag RAM 204 corresponding to the latched sub-keyfield value is reset the first time a record has such value, and set when a subsequent record has the same value. Control circuitry 60 is used to reset all bits of the Sort RAM 200 row corresponding to the latched sub-keyfield value. This is done only the first time a record has such value. Finally, control circuitry 70 is utilized to set the bit corresponding to the address of the record currently being processed in the Sort RAM row corresponding to the latched sub-keyfield value.

The operation of the Memory Loading logic of FIG. 3 will now be illustrated with reference to the eight sample records shown in FIG. 2A.

At the beginning of the Memory Loading process, the entire Active Flag Register 202 is reset in response to an appropriate signal from the hardware controller along lines 206. As shown in FIG. 2A, the most significant sub-keyfield of the record having address 0 has a value 129. This value is provided by the hardware controller along data lines 208, selectively gated through multiplexer 210, and stored in 8-bit register 212. Circuitry 40 is used to set bit 129 in Active Flag Register 202. To accomplish this, the contents of register 212 are applied via lines 214c to a negative logic decoder 216 which is enabled by an appropriate signal from the hardware controller along line 218. This causes the line comprising lines 220 which corresponds to the binary value of the input applied, to go low, thereby setting bit 129 of the Active Flag Register. During the Memory Loading process, all other lines 220 are held high since they are not selected by the decoder 216, and all lines 226 are held high since the negative logic decoder 222 is disabled. As a result, bit 129 of the Active Flag Register 202 is set and all other bits remain unchanged.

To indicate that only one record processed thus far had a most significant sub-keyfield value of 129, bit 129 in Duplicate Flag RAM 204 is reset using circuitry 50. Basically, bit 129 of the Duplicate Flag RAM 204 is addressed on lines 214a while low data input is provided along line 230, and then the RAM 204 is enabled for writing by an appropriate input from the hardware controller along lines 232 and 234.

Low data input along line 230 is provided by the following sequence of operations. The contents of register 212 are applied via lines 214b to positive logic decoder 232, thereby causing all lines 236, other than line 129 corresponding to the binary value of the input applied, to go low. The contents of Active Flag Register 202 outputted on lines 238a are all low due to the fact that the contents of the Active Flag Register were initially reset. The output from each of the two hundred fifty-six AND gates 240 is therefore low, and the output from a two hundred fifty-six input OR gate 242 is also low. Enabling tri-state bus driver 244 by an appropriate signal provided by the hardware controller along line 247, thereby causes line 230 to go low as well.

The contents of the register 212 are also used to set the appropriate bit in the Sort RAM 200. For the first record, bit (129, 0) of Sort RAM 200, corresponding to sub-keyfield value 129 and record 0, is set, and all other bits in row 129 are reset. Basically, this is accomplished by reading Sort RAM row 129 onto lines 246, resetting all bits in the row using the circuitry 60, setting bit 0 in the row using the circuitry 70, and rewriting the bits of the updated row to the Sort RAM 200.

Circuitry 60 is comprised of two hundred fifty-six 2-input AND gates. Lines 214e carrying the contents of register 212 select Sort RAM row 129. The contents of this row are read onto lines 246 in response to appropriate signals from the hardware controller along lines 254 and 256. The bits of row 129 are provided along lines 246a as one input to circuitry 60. The other input to circuitry 60 provided along lines 258 is the bit written to the Duplicate Flag RAM 204 and is therefore low when no record processed previously had the same sub-keyfield value as the record currently being processed and high otherwise. In the former case (as is the situation presently being discussed) the output from circuitry 60 is low.

Circuitry 70 is comprised of an 8-bit presettable up counter 260, a multiplexer 262, a positive logic decoder 264, two nundred fifty-six 2-input OR gates 268, and a 256-bit register 270. The contents of counter 260 represent the address of the record currently being processed. It is therefore initially loaded with a value of zero in accordance with low input received along lines 272, in response to an appropriate load signal from the hardware controller along line 274. It is constantly enabled and in upward counting mode due to appropriate enable and mode control signals along line 276. Its contents are selectively gated through multiplexer 262 to positive logic decoder 264 so that one input to each OR gate 268 is low except the input to the OR gate corresponding to the address of the record currently being processed. The other input to each OR gate is the output from circuitry 60 provided along lines 278. The effect of the OR gates is to set the bit corresponding to the address of the record currently being processed while leaving all other bits unchanged. The output from the OR gates is applied to register 270 which comprises two hundred fifty-six D-type flip-flops. The output of the register 270 is placed onto bus 246 in response to the control signal along line 280. In response to appropriate signals from the hardware controller along lines 254 and 256, the data on lines 246 is then written into Sort RAM 200 at row 129, i.e., the row currently being addressed by lines 214e and corresponding to tne sub-keyfield value of the record currently being processed.

Records 1 through 7 are processed in a similar fashion. The hardware controller successively provides the most significant sub-keyfield of each record along line 208, and the record address counter 260 is incremented by 1 to correspond to the next record address, in response to the control signal along line 282. The only significant difference in operation from the processing of record 0 occurs in connection with records 3 and 6 which have the same most significant sub-keyfield values as records 1 and 4, respectively. At the completion of record 1 processing, for example, bit 18 of Active Flag Register 202 is set; bit 18 of Duplicate Flag RAM 204 is reset; and bit (18, 1) of Sort RAM 200 is set, whereas all other bits in row 18 are reset. When record 3 is processed, therefore, both inputs to gate 18 of AND gates 240 are high, thereby causing the output from OR gates 242 to go high. Consequently, the input to Duplicate Flag RAM 204 along line 230 is high and bit 18 will be set to indicate that more than one record has the same sub-keyfield value 18. Also, the input to circuitry 60 along lines 258 is high so that circuitry 60 preserves previously set bits in row 18 of the Sort RAM 200 provided as the other input to circuitry 60.

FIG. 5A shows which bits in Active Flag Register 202, Duplicate Flag RAM 204, and Sort RAM 200 are set, reset or not significant at the completion of the Memory Loading process. For example, bits 2, 18, 19, 119, 129 and 191 in the Active Flag Register 202 are set which indicates that at least one record had a corresponding sub-keyfield value. By way of another example, bits 2 and 18 in the Duplicate Flag RAM are set which indicates that more than one record had a corresponding sub-keyfield value; bits 19, 119, 129 and 191 are reset which indicats that only one record had a corresponding sub-keyfield value. By way of a further example, bits (18, 1) and (18, 3) in the Sort RAM 200 are set, whereas all other bits in row 18 are reset, which indicates that only records 1 and 3 had a sub-keyfield value 18.

Figure 4:
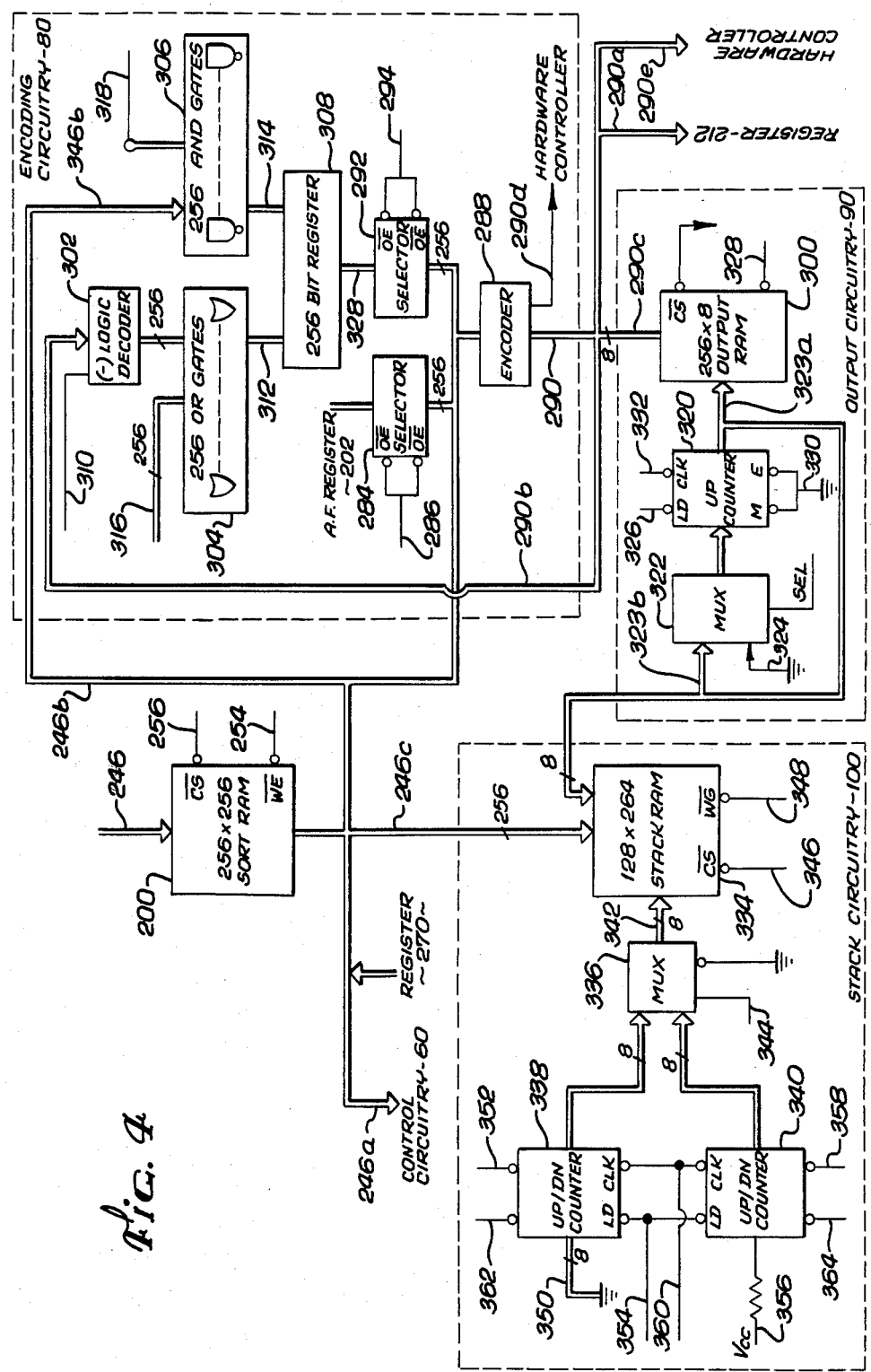
FIG. 4, is a block diagram of the encoding, output and stack circuitry in a preferred embodiment of the present invention.

After the loading of the Sort RAM has been completed, an Address Rearranging process is performed in which record addresses are arranged in accordance with the most significant sub-keyfield values of their corresponding records. Briefly, the address of each bit set in Active Flag Register 202 is successively determined in order of increasing address. These addresses correspond to the most significant sub-keyfield values of one or more records, and are successively used to address corresponding rows in Sort RAM 200. Referring to FIG. 4, the selected Sort RAM rows are successively provided as input to Encoding Circuitry 80, which determines the column position of each set bit in order of increasing position. These column positions correspond to record addresses, and are successively provided as input to Output Circuitry 90, which in turn writes the record addresses at consecutive address locations in a random access memory 300.

At this point the Address Rearranging process will be described in greater detail with reference to the circuitry of FIGS. 3 and 4, and using the bit arrangement in FIG. 5A by way of example. The address of the first set bit of the Active Flag Register 202, (address 2 as shown in FIG. 5A) is determined and loaded into register 212 in the following manner. The contents of Active Flag Register 202 are gated via lines 238b through a first selector 284 in response to an appropriate signal from the hardware controller along line 286. In turn, first selector 284 output is applied to encoder 288. Encoder 288 output along lines 290 is the binary coded address of the first set bit applied to it, which is "00000010" for address 2. That address is selectively gated via lines 290a through multiplexer 210 and latched into register 212. Note that an appropriate input to second selector 292 from the hardware controller along line 294 precludes any other input to encoder 288.

In order to prepare for a similar determination of the next set bit in Active Flag Register 202, circuitry 40 is used to reset bit 2 in the Active Flag Register. The contents of register 212 (i.e., 2) is applied via lines 214c and d to negative logic decoders 216 and 222, respectively. The hardware controller provides an appropriate disable signal to decoder 216 along line 218, and an appropriate enable signal to decoder 222 along line 224. As a result, output along lines 220 is high, and output along lines 226 is high except for line 2. Thus, bit 2 of Active Flag Register 202 is reset and all other bits remain unchanged.

The contents of register 212 are further used to address the corresponding row of Sort RAM 200 (i.e., row 2). In response to appropriate signals from the hardware controller along lines 254 and 256, the bits in the addressed row are read onto lines 246 and provided as input to Encoding Circuitry 80 along lines 246b.

Encoding circuitry 80 comprises a negative logic decoder 302, two hundred fifty-six 2-input OR gates 304, two hundred fifty-six 2-input NAND gates 306, a 256-bit register 308 referred to as the Duplicate Prioritizing Register, a second selector 292 and an encoder 288. The circuitry 80 is utilized to determine the column position of the first set bit, provided along lines 246b (i.e., bit 4 as shown in FIG. 5A by Sort RAM entry (2, 4).)

First, the entire Duplicate Prioritizing Register 308 which is comprised of two hundred fifty-six $\overline{RS}$-type flip-flops is reset. This is accomplished by applying an appropriate control signal from the hardware controller to one input of each of the OR gates 304 along lines 316, thereby driving all reset input lines 312 low. Then, the contents of the currently selected row of the Sort RAM 200 provided as input to the NAND gates 306 along lines 246b, are gated through the NAND gates 306 to the set inputs of the Duplicate Prioritizing Register 308 along lines 314. The other input to the NAND gates 306 is a timed control signal from the hardware controller along lines 318 for loading the Duplicate Prioritizing Register 308.

Second, the contents of the Duplicate Prioritizing Register 308 are gated via lines 328 through second selector 292 in response to an appropriate signal from the hardware controller along line 294. In turn, the second selector 292 output is applied to encoder 288. Encoder 288 output along lines 290 is the binary coded address of the first set bit applied to it. Note that an appropriate input to first selector 284 from the hardware controller along line 286 precludes any other input to encoder 288.

Third, encoder output along lines 290c is provided to Output Circuitry 90 comprising an Output RAM 300, a counter 320 and a multiplexer 322. In the following manner Circuitry 90 is utilized to write the record address (i.e., 4) to the first address in the Output RAM.

Output RAM 300 is a random access memory comprising two hundred fifty-six 8-bit words for storing the record addresses in their rearranged order. Counter 320 is a presettable up counter whose contents address along lines 323a the location in the Output RAM 300 where the next record address is to be written. It is therefore initially loaded with a value of zero by selectively gating low input from lines 324 through multiplexer 322, and then providing appropriate load signals from the hardware controller along line 326. Thus, the encoded address (i.e., 4) is written to the Output RAM 300 at address 0 in response to an appropriate write signal from the hardware controller along line 328. Thereafter, counter 308 is operated as an upward counter in accordance with the constant mode control and enable signals provided along line 330. Thus, the contents of counter 320 are incremented by 1 in response to the next clock signal along line 332.

Fourth, encoder 288 output along lines 290b is used to reset the corresponding bit (i.e., bit 4) in the Duplicate Prioritizing Register 308 so that the next set bit can be determined. This is accomplished in the following manner. The control input to NAND gates 306 from the hardware controller along lines 318 is low, thereby causing the set input to the Duplicate Prioritizing Register 308 to remain high. The encoder output along lines 290b is applied to the negative logic decoder 302. An appropriate control signal from the hardware controller along line 310, thus causes decoder output provided as input to OR gates 304 to go high except for the line corresponding to the bit to be reset (i.e., line 4). The other input to OR gates 304 from the hardware controller along lines 316 is high, thereby causing the reset input to the Duplicate Prioritizing Register 308 along lines 312 to be low only for the line corresponding to the bit to be reset (i.e, line 4).

Encoding Circuitry 80 is then used to determine the column position of the next set bit currently latched into the Duplicate Prioritizing Register 308. The encoded address (i.e., bit 6 as shown in FIG. 5A by Sort RAM entry (2. 6)) is provided and written to Output RAM 300 at address 1 in a similar fashion as discussed above and then used to reset the corresponding bit in register 308 to prepare for the next encoding process. Counter 300 is again incremented by 1 in response to the next control signal along line 332.

Encoding Circuitry 80 is once again employed to determine the column position of the next set bit currently latched into register 308. But, since there are no more set bits, the output from encoder 288 to the hardware controller along line 290d signals that no more set bits remain and thus no more record addresses are to be encoded and written to Output RAM 300.

Note that if only a single bit is set in the row of the Sort RAM 200 corresponding to the value latched into register 212, then it is not necessary to employ the Encoding Circuitry 80 to successively "encode" multiple, set bits to be written to the Output RAM 300. In such a case, under the control of the hardware controller, the bits of the Sort RAM row are instead provided directly to the encoder 288 along lines 246d, which determines the appropriate record address. This is discussed in more detail below in connection with the Stack Circuitry 100.

Each set bit in Active Flag Register 202 is processed in similar fashion until the output provided to the hardware controller from encoder 288 along line 290d signals that no more set bits remain in the Active Flag Register and that the Address Rearranging process has been completed.

At that time the record addresses stored consecutively in Output RAM 300 may be used to read records in corresponding order, thereby furnishing the records in ascending order of most significant sub-keyfield values. FIG. 2B shows the record addresses in their rearranged order and the keyfield values of their corresponding records.

Thus, if there had been two hundred fifty-six records to be rearranged and each had a unique most significant sub-keyfield value, such records would be rearranged without it being necessary to perform any operation whatsoever upon less significant sub-keyfields. However, some records may indeed have the same most significant sub-keyfield values. For example, as shown in FIG. 2B, records 4 and 6 each have a value of 2, and records 1 and 3 each have a value of 18. Thus, record addresses corresponding to records having the same most significant sub-keyfield values may not be properly ordered relative to each other, but as a "group" are properly ordered relative to all other record addresses.

In order to rearrange record addresses within a group relative to each other, it is necessary to perform a "second pass" through the two-step procedure described above; i.e., the two-step procedure is repeated for "each" group of records having the same most significant sub-keyfield values, but now using the second most significant sub-keyfield. During the second pass, the record addresses comprising a group are rewritten in rearranged order beginning at the lowest address in the Output RAM 300 where the first of the group was previously stored, thereby preserving their order relative to all other record addresses.

Since the two-step procedure is repeated separately for each group of records having the same most significant sub-keyfield value, it is necessary to have a method of storing, during each "pass," the corresponding record addresses by group along with the group's corresponding Output RAM starting address. Further, there is no guarantee that some records do not have the same most significant sub-keyfield value and the same second most significant sub-keyfield value as well. For example, as shown in FIG. 2B, records 4 and 6 each have a most significant sub-keyfield value of 2 and a second most significant sub-keyfield value of 47. As a result, a third pass through the two-step procedure is necessary with respect to each such group of records; therefore similar information need be stored during the second pass. In fact, the number of passes required may equal the number of sub-keyfields since some records may have identical keyfields; therefore, similar information is stored during each successive pass performed.

In order to store such information the circuitry shown in FIG. 4 further includes Stack Circuitry 100 for storing the necessary information during one pass and making it available during the next pass. The Stack Circuitry includes Stack RAM 334 which is a random access memory comprising a 128 by 264 matrix of discrete bit locations, a multiplexer 336, and a pair of 8-bit presettable up/down counters 338 and 340.

Briefly, it will be remembered that records having an address corresponding to the column position of set bits in the same Sort RAM row have the same most significant sub-keyfield values. Therefore, during the first pass through the Address Rearranging process, Sort RAM rows having more than 1 set bit are loaded into the Stack RAM 334 at consecutive addresses beginning with address 0 and increasing thereafter. Also loaded into the Stack RAM 334 is the corresponding Output RAM starting address. An Odd Pass counter 338, operating as an upward counter, selects the appropriate address of the Stack RAM 334.

With reference to the sample records shown in FIG. 2A, at the completion of the first pass the record addresses written to the Output RAM 300 are arranged into the order shown in FIG. 2B. The Stack RAM will be as shown in FIG. 6A: entry 0 shows that records 4 and 6 have the same most significant sub-keyfield value, and that the corresponding Output RAM starting address is 0; and entry 1 shows that records 1 and 3 have the same most significant sub-keyfield value, and that the corresponding Output RAM starting address is 2.

Upon completion of the first pass, the Stack RAM entries are successively removed in reverse order (i.e., last in-first out (LIFO)) and a second pass is performed; i.e., the two-step procedure is appropriately repeated separately for each group of records using the second most significant sub-keyfield. The Odd Pass counter 338 now operates as a downward counter to select the appropriate row of the Stack RAM 334. In the present example, therefore, entry 1 comprising records 1 and 3 is first to be removed. As shown in FIG. 2B, records 1 and 3 have second most significant sub-keyfield values of 118 and 116, respectively. Hence, at the completion of the Memory Loading process the arrangement of bits in the Active Flag Register, Duplicate Flag RAM and Sort RAM will be as shown in FIG. 5B. Further, at the completion of the Address Rearranging process, the position of their corresponding addresses written to the Output RAM is reversed as shown in FIG. 2C.

Entry 0 comprising records 4 and 6 is next removed from the Stack RAM 334. As shown in FIG. 2C, records 4 and 6 each have second most significant sub-keyfield values of 47. Hence, at the completion of the Memory Loading process the bit arrangement is as shown in FIG. 5C. At the completion of the Address Rearranging process, the position of their corresponding addresses written to the Output RAM remain unchanged as shown in FIG. 2D.

However, as the Address Rearranging process during the second pass is performed for a group of records, Sort RAM rows having more than 1 set bit are similarly loaded into Stack RAM 334 along with the corresponding Output RAM starting address. Such entries are made at consecutive addresses beginning with address 127 and decreasing thereafter. An Even Pass counter 340 operating as a downward counter selects the appropriate address of the Stack RAM 334. Hence, at completion of the second pass in our present example, the Stack RAM will be as shown in FIG. 6B: entry 127 shows that records 4 and 6 have the same second most significant sub-keyfield value, and that the corresponding Output RAM starting address is 0.

Upon completion of the second pass, the Stack RAM entries are successively removed in reverse order (i.e. LIFO) and a third pass is performed, i.e., the two-step procedure is appropriately repeated separately for each group of records using the third most significant sub-keyfield. The Even Pass counter 340 now operates as an upward counter to select the appropriate address of the Stack RAM 334. In the present example, entry 127 comprising records 4 and 6 is removed. As shown in FIG. 2D, records 4 and 6 have third most significant sub-keyfield values of 189 and 194, respectively. Hence, at the completion of the Memory Loading process the bit arrangement is as shown in FIG. 5D. At the completion of the Address Rearranging process, the position of their corresponding addresses written to the Output RAM is reversed as shown in FIG. 2E.

It should now be readily apparent that the two-step procedure is repeated using each successive next most significant sub-keyfield until a pass is completed without any entries made into the Stack RAM 334 or all the sub-keyfields have been processed Further, the Odd and Even Pass counters alternate function and operation to enable entries to be made in the Stack RAM 334 during one pass while allowing entries made during the immediately preceding pass to be removed for processing. In the present example, the proper order is resolved by the end of the third pass as indicated by the fact that no entries were loaded into the the Stack RAM.

The operation of Stack Circuitry 100 will now be discussed with reference to FIGS. 3 and 4. For purposes of this discussion, the operation of the Encoding Circuitry 70 is similar to that described above in connection with "encoding" bits comprising a row of the Sort RAM 200 for the purpose of writing to the Output RAM.

The Stack RAM 334 is addressed along lines 342 by the contents of the Odd Pass counter 338 or the Even Pass counter 340, depending on which is selectively gated through multiplexer 336 under control of the hardware controller along line 344. Writing to and reading from the Stack RAM 334 is accomplished in response to appropriate write/read signals from the computer along lines 346 and 348. The Odd Pass counter 338 will be initially loaded with the value of 0 in accordance with low input on input lines 350, in response to appropriate enable and load signals from the hardware controller along lines 352 and 354, respectively. Similarly, the Even Pass counter 340 may be initially loaded with a value of 127 in accordance with high input along lines 356, in response to appropriate enable and load signals from the hardware controller along lines 358 and 354, respectively. Appropriate signals from the hardware controller along lines 352 and 358 prevent counting in response to clock signals along lines 360 when a Stack RAM entry has been made or removed as the case may be. The direction of count in the Odd and Even Pass counters is controlled by the hardware controller by appropriate signals along lines 362 and 364, respectively.

With respect to making entries into the the Stack RAM 334, it will be remembered that during the Address Rearranging process, the bits comprising the Active Flag Register 202 are encoded and the encoded values, which correspond to sub-keyfield values of one or more records, are successively latched into register 212. The latched value is used to address the corresponding bit of the Duplicate Flag RAM 204 along lines 214a, which is provided to and sensed by the hardware controller along line 230.

If the sensed bit has a value 1, this indicates that more than one processed record had a sub-keyfield value the same as the latched value. In such a case, it is necessary to make an appropriate entry in the Stack RAM 334 and reserve consecutive addresses in the Output RAM 300 equal to the number of records having a sub-keyfield value the same as the latched value. Under the control of the hardware controller, an entry is made into the Stack RAM 334 consisting of the bits comprising the Sort RAM row corresponding to the latched value, and the contents of the counter 320 having a value equal to the next address in the Output RAM. Simultaneously, the bits comprising the Sort RAM row corresponding to the latched value are loaded into the Duplicate Prioritizing Register 308. The Encoding Circuitry 80 is then used to successively generate the appropriate record addresses which are in turn written to the Output RAM 300 using the Output Circuitry 90; this reserves the proper number of address locations in the Output RAM 300, and ensures that the record addresses of records having identical keyfield valaes (i.e., all sub-keyfield values are the same) are written to the Output RAM 300.

Note that if the sensed bit instead had a value ∅, this would indicate that only one processed record had a sub-keyfield value the same as the latched value. In such case it is only necessary to enter the address of such record into the Output RAM 300. Further, since the address is indicated by the column position of a single bit set in the row of the Sort RAM 200 corresponding to the latched value, it is not necessary to employ the Encoding Circuitry 80 to successively encode multiple, set bits. Thus under the control of the hardware controller, the bits comprising the row of the Sort RAM 200 corresponding to the latched value are provided as input directly to the encoder along lines 246d which generates the appropriate record address which is in turn written to the Output RAM using the Output Circuitry 90.

A more detailed description of the process for making entries into the Stack Ram 334 now follows. The latched value selects a row of the Sort RAM 200 to be read onto lines 246 and provided to Encoding Circuitry 80 along lines 246b. The bits comprising the Sort RAM row read onto lines 246, however, also provide high order bit input to the Stack RAM 334 along lines 246c. At that time, the output from counter 320 along lines 323a selects the Output RAM 300 starting address for the record addresses encoded from the Sort RAM row. The output from counter 320, however, is also provided as low order bit input to the Stack RAM 334 along lines 323b. Further, the address latched into register 212 also selects a corresponding bit in the Duplicate Flag RAM 204 which is read onto bus 230 and provided to the hardware controller, in response to appropriate signals from the hardware controller along lines 232 and 234. In response to receipt of a set bit indicating that more than one bit is set in the corresponding Sort RAM row, the hardware controller furnishes appropriate signals to the Stack RAM 334 along lines 346 and 348 causing the input provided along lines 246c and 323b to be written at the address selected along lines 342. The hardware controller also removes the inhibit signal to the appropriate Odd or Even Pass counter for one clock pulse, thereby permitting the contents of the counter to be incremented or decremented by 1 as the case may be so that the next the Stack RAM address is selected along lines 342.

Initially, the Duplicate Prioritizing Register 308 is reset. The Sort RAM row component of the Stack RAM entry is then read onto lines 246c, and loaded into the Duplicate Prioritizing Register. Simultaneously, the Output RAM starting address is read onto lines 323b, gated through multiplexer 322, and loaded into counter 320 in response to appropriate signals from the hardware controller along line 326; this ensures that record addresses from stack RAM 334 will be written to the correct area in the Output Ram 300.

The column position of the first set bit in the Duplicate Prioritizing Register 308 is generated as an 8-bit value by the Encoding Circuitry 80. This value represents the address of the first record in the group currently being processed. It is provided back to the Encoding Circuitry along lines 290b to reset the corresponding bit in the Duplicate Prioritizing Register 308, and generation of the next record address in the current group is initiated. It is simultaneously passed to the hardware controller along liens 290e and used to perform the Memory Loading process for the current sub-keyfield of the corresponding record. The hardware controller thus provides the record address to Circuitry 70 along lines 298 and causes it to be selectively gated through multiplexer 262, in order to select the proper column position when writing to the Sort RAM 200 during the Memory Loading process. Simultaneously, the hardware controller provides the current sub-keyfield of the corresponding record along lines 208 and causes it to be selectively gated through multiplexer 210 and latched into register 212.

The remaining record addresses in the current group are similarly determined and used to perform a Memory Loading process until the output from the encoder 288 provided to the hardware controller along line 290d indicates that the Memory Loading process has been performed on all the records in the current group.

It may be desirable to rearrange a group of records into a predetermined keyfield value order other than ascending order. For this purpose, the hardware controller is programmed for collating sequence translation; i.e., it is programmed to translate the actual sub-keyfield value provided by the computer into predetermined, corresponding sub-keyfield values. These translated sub-keyfield values are provided to the Memory Loading logic along lines 208 in place o the actual sub-keyfield values. For example, assume that it is desirable to rearrange two hundred fifty-six records, each having a unique most significant sub-keyfield value from 0 to 255, in descending keyfield order, i.e., reverse collating sequence order. The following table depicts the mapping from the actual most significant sub-keyfield values to their translated counterparts:

| ACTUAL | TRANSLATED |
|--------|------------|
| 0      | 255        |
| 1      | 254        |
| .      | .          |
| .      | .          |
| .      | .          |
| 253    | 2          |
| 254    | 1          |
| 255    | 0          |

Such a collating sequence translation capability is most advantageous since keyfield data may be stored in a variety of data formats such as EBCDIC, USASCII, floating point and BCD, each having a different collating sequence.

The rearranging method and system disclosed by the present invention may be used to rearrange any number of records. This is accomplished by successively rearranging groups of two hundred fifty-six records, the records in each group being selected in accordance with any well-known merging algorithm.

The present invention can also be used to search a group of records, each having a unique keyfield value, for a record having a given keyfield value. A "dummy" record having the given keyfield value is added to the group of records to be searched. At the end of the rearranging process, if two records have the same keyfield value, one is the dummy record and the other is the record intended to be located. This would be indicated by an entry in the Stack RAM 334 after all sub-keyfields have been processed. In a similar manner as discussed above, under the control of the hardware controller, that Stack RAM entry is provided to the Encoding Circuitry 70 which is used to determine the appropriate record address.

Various other applications of the principles disclosed in the present invention will be apparent to those skilled in the art. The scope of the invention is best defined by the following claims.

What is claimed is:

1. A system for arranging unique record address values corresponding to a plurality of data records wherein each record is comprised of a plurality of bits and is identified by a unique record address value, wherein one or more bits of each record comprises a keyfield and the record address values of the plurality of records are arranged in accordance with the value of said keyfields, said system comprising:
   a. matrix memory means having a plurality of rows and columns, wherein each row corresponds to a different keyfield value and each column corresponds to a different record address value;
   b. first control means for setting, for each record, one memory location in the column of the matrix memory means corresponding to the record address value of that record, said memory location being in the row of the matrix memory means corresponding to the keyfield value of that record; and
   c. second control means for detecting, for each row of the matrix memory means, in order of row position, the column postion of each set memory location in that row.

2. The system of claim 1 wherein the matrix memory means is a random access memory.

3. The system of claim 2 wherein the first control means includes:
   a. addressing means for providing to the matrix memory means, for each record, the keyfield value of that record as an address of a row of the matrix memory means; and
   b. selection means for setting, for each record, one memory location in the addressed row of the matrix memory means, said memory location being in the column corresponding to the record address value of that record.

4. The system of claim 2 wherein the second control means includes:
   a. addressing means for providing to the matrix memory means, for each row in the matrix memory means having one or more set memory locations, in order of row position, the keyfield value associated with that row as an address for that row; and
   b. detection means for detecting the column position of each set memory location in an addressed row.

5. The system of claim 4 wherein the addressing means includes:

a. address memory means having a plurality of memory locations, each said memory location corresponding to a different keyfield value;

b. input control means for setting, for each record, the memory location in the address memory means corresponding to the keyfield value of that record; and c. wherein the detection means is also utilized for detecting the position of each set memory location in the address memory means.

6. The system of claim 5 wherein the address memory means is a register.

7. The system of claim 2 further including output memory means for receiving and storing the column positions detected by the second control means in the order detected.

8. The system of claim 7 wherein the output memory means is a random access memory.

9. A system for arranging unique record address values corresponding to a plurality of data records wherein each record is comprised of a plurality of bits and is identified by a unique record address value, wherein a portion of each record comprises a keyfield, wherein each keyfield is divided into a plurality of sub-keyfields, each of said sub-keyfields having a different order of significance, and wherein the record address values of the plurality of records are arranged in accordance with the value of said keyfields, said system comprising:

a. matrix memory means having a plurality of rows and columns, wherein each row corresponds to a different sub-keyfield value and each column corresponds to a different record address value;

b. first control means for receiving sub-keyfield values and setting one memory location in the row of the matrix memory means corresponding to the sub-keyfield value received, said memory location being in the column of the matrix memory means corresponding to a record having that sub-keyfield value;

c. second control means for detecting, separately for each row of the matrix memory means, in order of row position, the column position value of each set memory location in that row and for collectively recording each group of column position values detected from memory locations in the same row of the matrix memory means;

d. third control means for initially providing the sub-keyfield value of greatest significance of each record to the first control means and for subsequently providing, separately for each group of column position values recorded by the second control means having more than one member in said group, the sub-keyfield value of next greatest significance for each record having a record address value corresponding to a column position value in said group.

10. The system of claim 9 wherein the matrix memory means is a random access memory.

11. The system of claim 10 wherein the first control means includes:

a. addressing means for providing to the matrix memory means the sub-keyfield values received from the third control means as an address for the row of the matrix memory means corresponding to that sub-keyfield value; and b. selection means for setting one memory location in the addressed row of the matrix memory means, said memory location being in the column corresponding to the record address value of the record corresponding to the sub-keyfield value.

12. The system of claim 10 wherein the second control means includes:

a. addressing means for providing to the matrix memory means, for each row in the matrix memory means having at least one set memory location, in order of row position, the sub-keyfield value associated with that row as an address for that row; and b. detection means for detecting the column position value of each set memory location in an addressed row.

13. The system of claim 12 wherein the addressing means includes:

a. address memory means having a plurality of memory locations, each memory location corresponding to a different sub-keyfield value;

b. input control means for setting, in response to each sub-keyfield value received, the memory location in the address memory means corresponding to that sub-keyfield value; and c. wherein the sub-keyfield values received by the input control means are provided by the third control means and are the same sub-keyfield values which are provided by the third control means to the first control means; and wherein the detection means is also utilized for detecting the position of each set memory location in the address memory means.

14. The system of claim 13 wherein the address memory means is a register.

15. The system of claim 14 wherein the second control means further includes row detection control means for detecting each row of the matrix memory means having at least two set memory locations in said row.

16. The system of claim 15 wherein the row detection control means includes:

a. address memory means having a plurality of memory locations, wherein the position of each memory location corresponds to a different sub-keyfield value;

b. input control means for setting, in response to a sub-keyfield value received which is the same as a previously received sub-keyfield value, the memory location in the address memory means corresponding to that sub-keyfield value; and c. wherein the sub-keyfield values received by the input control means are provided by the third control means and are the same sub-keyfield values which are provided by the third control means to the first control means.

17. The system of claim 16 wherein the address memory means is a random access memory.

18. The system of claim 17 further including output memory means for storing the column position values detected by the second control means in the order detected, beginning at the memory location in said output memory means having a predetermined address; and wherein the third control means is also utilized for initially providing the address value of the first memory location in the output memory means and for subsequently providing, separately for each group of column position values recorded by the second control means having more than one member, the address value of the first memory location in the output memory means where one of said column position values were stored.

19. The system of claim 18 wherein the output memory means is a random access memory.

20. The system of claim 19 wherein the second control means further includes row detection memory means for storing, for each row detected by the row detection means, the column position value of each memory location in said detected row together with the address value of the first memory location in the output memory means where one of said column position values is stored.

21. The system of claim 20 wherein the row detection memory means is a random access memory.

22. A method for arranging unique record address values corresponding to a plurality of data records wherein each record is comprised of a plurality of bits and is identified by a unique record address value, wherein one or more bits of each record comprises a keyfield and the record address values of the plurality of records are arranged in accordance with the values of said keyfields, said method comprising the steps of:
   a. providing the keyfield value of each record to a matrix memory means having a plurality of rows and columns, each of said rows corresponding to a dirrerent keyfield value and each of said columns corresponding to a different record address value;
   b. setting, for each keyfield value provided to the matrix memory means, one memory location in the column of the matrix memory means corresponding to the record address value of that record, said memory location being in the row of the matrix memory means corresponding to the keyfield value of that record; and
   c. arranging the column position values of the set memory location in order of row position.

23. The method of claim 22 further including the step of providing each record identified by a record address value corresponding to a column position value arranged in the arranged order.

24. The method of claim 22 further comprising the steps of:
   a. writing the column position values in order of row position at consecutively addressable locations in an output memory means; and
   b. providing each record identified by a record address value corresponding to a column position value written to the output memory means, in accordance with the relative position of the addressable location in said output memory means where said column position value was written.

25. A method for arranging unique record address values corresponding to a plurality of data records wherein each record is comprised of a plurality of bits and is identified by a unique record address value, wherein a portion of each record comprises a keyfield, wherein each keyfield is divided into a plurality of sub-keyfields, each of said sub-keyfields having a different order of significance, and wherein the record address values of the plurality of records are arranged in accordance with the value of said keyfields, said method comprising the steps of:
   a. providing the sub-keyfield values of greatest significance of each record to a matrix memory means having a plurality of rows and columns, each of said rows corresponding to a different sub-keyfield value and each of said columns corresponding to a different record address value;
   b. setting, for each of said sub-keyfield values provided to he matrix memory means, one memory location in the column of the matrix memory means corresponding to the record address value of that record, said memory location being in the row of the matrix memory means corresponding to the sub-keyfield value of that record;
   c. arranging the column position values of the set memory locations in order of row position;
   d. grouping together the column position values of set memory locations in the same row of the matrix memory means;
   e. repeating steps a through d, inclusive, separately for each group of column position values, for the sub-keyfield value of next greatest significance of each record having a record address value corresponding to a column position value in said group; and
   f. repeating step e so long as at least one group of column position values remain.

* * * * *